US005781867A

United States Patent [19]

Tidwell

[11] Patent Number: 5,781,867

[45] Date of Patent: Jul. 14, 1998

[54] TELESCOPING MAST ANTENNA FOR WIRELESS DEVICES HAVING ROTATING MAST

[75] Inventor: Stephen B. Tidwell, Carlsbad, Calif.

[73] Assignee: Qualcomm Incorporated, San Diego, Calif.

[21] Appl. No.: 655,173

[22] Filed: May 30, 1996

[51] Int. Cl.[6] .................................................. H04B 1/38

[52] U.S. Cl. ........................... 455/575; 455/90; 343/702; 343/901

[58] Field of Search ............................ 455/575, 90, 128, 455/129; 343/702, 883, 901, 889, 900

[56] References Cited

U.S. PATENT DOCUMENTS

| | | | |
|---|---|---|---|
| 2,224,032 | 12/1940 | Kline . | |
| 4,725,845 | 2/1988 | Phillips | 343/702 |
| 5,166,695 | 11/1992 | Chan et al. | 343/702 |
| 5,493,506 | 2/1996 | Takeyasu | 455/575 |
| 5,593,129 | 1/1997 | Adams et al. | 343/883 |
| 5,628,057 | 5/1997 | Phillips et al. | 455/575 |

*Primary Examiner*—Edward F. Urban
*Attorney, Agent, or Firm*—Russell B. Miller; Gregory D. Ogrod

[57] ABSTRACT

A telescoping antenna assembly has a tubular base for securing to a wireless telephone handset and an extendible mast telescopically mounted on the tubular base for movement between an extended position extending out of the tubular base and a retracted position in which at least the majority of the mast is retracted within the tubular base. The tubular base and mast have mating inner and outer surfaces. One of the mating surfaces has a helical groove extending along at least part of its length, and the other cylindrical surface has at least one pin slidably engaged in the groove. The engagement of the pin in the helical groove causes the mast to rotate relative to the base in a first direction as the mast is moved from the retracted to the extended position, and in a second direction as the mast is moved from the extended to the retracted position, uncoiling and then recoiling the antenna feed line so as to reduce stretching and torque on the line.

13 Claims, 1 Drawing Sheet

TELESCOPING MAST ANTENNA FOR WIRELESS DEVICES HAVING ROTATING MAST

BACKGROUND OF THE INVENTION

I. Field of the Invention

The present invention relates generally to satellite communications and is particularly concerned with portable or handheld telephone units which are used for wireless communications with a remote site using communications satellites for transmitting and receiving radio frequency signals, and with a specialized antenna for use with such systems.

II. Related Art

In a cellular telephone system, communication occurs using fixed base stations, also referred to as cell sites, each covering a specific geographical area. In satellite communications, signals are transmitted to and from orbiting satellites. Large scale communication systems typically provide communication between fixed and mobile user stations or subscriber units using satellite or earth-based repeater apparatus, or both. Such systems are described, for example, in U.S. Pat. No. 4,901,307, which issued Feb. 13, 1990 under the title *Spread Spectrum Multiple Access Communication System Using Satellite or Terrestrial Repeaters*, and U.S. patent application Ser. No. 08/368,570, filed under the title *Method and Apparatus for Using Full Spectrum Transmitted Power in a Spread Spectrum Communication System for Tracking Individual Recipient Phase Time and Energy*, which are both assigned to the assignee of the present invention, and incorporated herein by reference.

A subscriber unit or handset in such systems requires a specialized antenna for communication with satellites. Typically, the handset has a mouthpiece or microphone, an earphone or speaker, internally mounted components for receiving, processing and transmitting radio frequency signals, and an external antenna. The internal circuitry is suitably linked to the microphone, speaker and external antenna in a manner well known in the field. Orientation of the antenna can be quite important for proper signal communication with a satellite.

A vertically correcting antenna for such a satellite communication system is described in co-pending U.S. patent application Ser. Nos. 08/532,920 filed on Sept. 22, 1995 under the title *Vertically Correcting Antenna*, and 08/538,562 filed Oct. 3, 1995, for *Multi-Axis Vertically Corrected Antenna for Handheld Wireless Communications Devices*, which are assigned to the assignee of the present application, and incorporated herein by reference.

Another factor which can improve communications is the height of the antenna structure, and telescoping antennas have, therefore, been proposed for use with a portable telephone handset, so that the height of the antenna structure above the handset can be increased. Use of a telescoping device has the advantage of elevating a radiating antenna above a user's head, which may reduce blockage. This has the added advantage of reducing undesirable radiation exposure to the user. A telescoping antenna typically has a tubular base and a telescoping mast for telescoping into the base when not in use, and extending out of the base when the phone is in use. The antenna receivers and radiators in the mast must be connected to circuitry within the phone via cables which extend from the mast through the base and into the phone unit. One problem in designing a telescoping mast is that the cable must have minimal length to avoid signal loss, yet must be resistant to breakdown or failure after repeated use.

SUMMARY OF THE INVENTION

It is an object of the present invention to provide a new and improved telescoping mast antenna for a portable wireless telephone handset.

According to the present invention, a telescoping antenna is provided which comprises a tubular base for securing to a wireless telephone handset and an extendible mast telescopically mounted on the tubular base for movement between an extended position extending out of the tubular base and a retracted position in which the majority of the mast is retracted within the tubular base, the tubular base having a first mating cylindrical inner surface and the mast having a second mating cylindrical outer surface for fitting within the tubular base in the retracted position, one of the mating cylindrical surfaces of the base and mast having a helical groove extending along at least part of its length, and the other cylindrical surface having at least one pin for sliding engagement in the groove, whereby the engagement of the pin in the helical groove causes the mast to rotate relative to the base in a first direction as the mast is moved from the retracted to the extended position, and in a second direction as the mast is moved from the extended to the retracted position.

A heat set, coiled coaxial cable providing the antenna feed line is secured at one end to circuitry within the telephone handset and is connected at the opposite end to the antenna feed in the telescoping mast. As the mast is repeatedly extended and retracted, the coiled cable is similarly extended and compressed. By providing a rotating connection between the base and antenna mast, the coaxial cable feed line is allowed to coil up as the antenna is collapsed and to "un-coil" as the antenna is extended, relieving torque and reducing the risk of torsional forces causing the cable to fail prematurely or the contacts to break or fail. This technique may extend the lifetime of a telescoping mast antenna.

The helical groove may be provided either in the inner surface of the base or the outer mating surface of the mast, with the pin being provided in the other mating surface. A set of spaced pins may be provided for engagement in the groove. Preferably, the groove and pin each have a low friction surface and may be of self-lubricating plastic, for example, to reduce the risk of the pin sticking in the groove.

BRIEF DESCRIPTION OF THE DRAWINGS

The present invention will be better understood from the following detailed description of some preferred embodiments of the invention, taken in conjunction with the accompanying drawings, in which like reference numerals refer to like parts, and in which.

DESCRIPTION OF THE PREFERRED EMBODIMENTS

Figure 1:
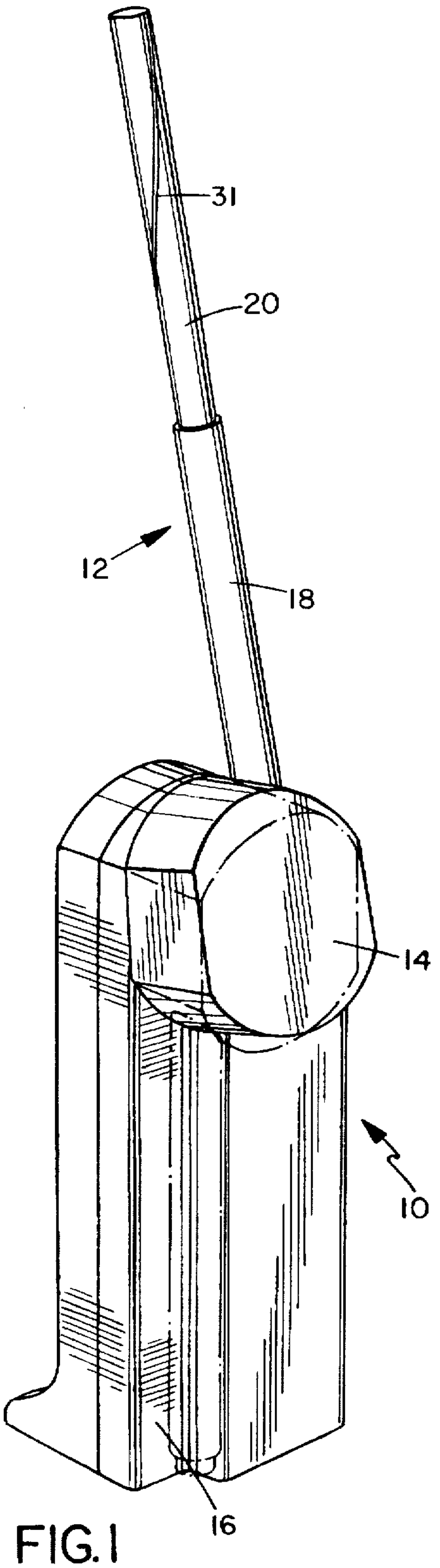
FIG. 1 is a perspective view of a wireless telephone handset incorporating a telescoping antenna according to a preferred embodiment of the invention.

FIG. 1 of the drawings illustrates a portable telephone handset 10 with an antenna structure 12. The antenna structure incorporates a telescoping mast according to a preferred embodiment of the present invention, and as described in more detail below in connection with FIGS. 2 and 3. The portable telephone handset illustrated is preferably as described in our co-pending application Ser. No. 08/538,562, referred to above, with the antenna structure mounted so that it may be manually rotated into a vertical orientation regardless of the orientation of the handset 10. However, it will be understood that the telescoping mast structure of this invention may alternatively be incorporated in other types of portable telephone handsets or wireless devices for satellite and other wireless communications purposes, and may be fixed in both the extended and retracted positions rather than freely rotatable into a vertical orientation.

Antenna module 14 is rotatably mounted on a rear wall of the handset 10, with the antenna structure projecting from module 14. Alternatively, the antenna may be mounted directly on the phone housing or handset 10. The antenna may incorporate any type of antenna radiator and receiver structure which is conventionally used in satellite communications, such as, but not limited to, a quadrifilar helix antenna. The module 14 is rotatable so that the antenna may be rotated into vertical orientation when the handset is in use, although this is not essential. The housing has an elongated recess 16 in which the retracted antenna structure 12 is stored when the handset is not in use for transmission of signals. It will be understood that the antenna is still operable to receive incoming signals when retracted and stored.

Figure 2:
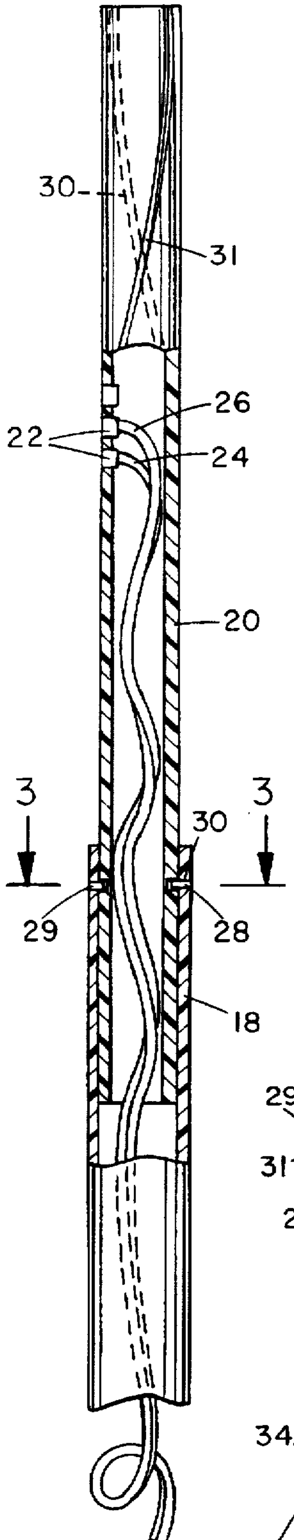
FIG. 2 is an enlarged view of the extended antenna, with portions cut away.

As best illustrated in FIG. 2, the antenna structure 12 comprises a tubular antenna base 18 suitably secured in a mounting bore in module 14, and an antenna mast 20 telescopically mounted in base 18. The antenna mast 20 will have antenna radiators incorporated into its structure in any appropriate manner (not illustrated) and may have a foam filled core. Feed points or contacts 22 are provided on the inner surface of mast 16 for feeding the radiators in the conventional manner. Two coaxial cable pairs or antenna feed lines 24, 26, one for sending and one for receiving, are connected at one end to respective contacts 22, and extend through the lower end of mast 20 and the base 18 for connection to the circuitry within module 14. Cables 24, 26 each have a thermoset plastic jacket and are formed into helical coils in the same manner as a coiled phone handset cord. The cables provide signal transfer paths for each antenna element, as is well known in the field. Two coaxial cables are used in the illustrated embodiment, since there are two antennas or sets of radiator paths. However, in some applications one antenna or set of radiators may be used, particularly for single frequency operations, and in this case only one coaxial cable will be needed.

The base tube 18 has a pair of diametrically opposed, inwardly directed pins 28, 29 adjacent its upper end, while the mast 20 has a pair of diametrically spaced helical grooves 30, 31 extending along its length. Grooves 30, 31 have the same pitch. Pin 28 engages in groove 30 while the opposing pin 29 engages in groove 31, so that the mast must rotate relative to base tube 18 as it telescopes in and out of the tube. A greater or lesser number of pins may be provided in alternative embodiments. The rotation is arranged such that it will tend to coil up cables 24, 26 as the mast is retracted into the base, and uncoil the cables as it is extended, reducing torque and the potential risk of failure at the contacts 22. The coiling operation also allows the cable or line to be made a minimal length that extends as the antenna mast is deployed, while coiling in a manner that prevents breakdown or failure. When the mast is fully deployed, the cable will still have some coil, so that mast deployment does not over stretch the coil to the extent that it may fail.

Preferably, both the pins and the grooves have a coating of low friction material such as self-lubricating plastic, to reduce the risk of the pins sticking or jamming. The pins may incorporate a wiper mechanism for wiping any dirt or dust from the groove as the mast is telescoped back into the base, or separate flexible wipers may be provided at an appropriate position for engagement in the grooves. In the arrangement illustrated in FIGS. 1–3, the mast rotates in an anti-clockwise direction as it is extended from the base, and in a clockwise direction as it is retracted. The amount of rotation provided by the arrangement is preferably of the order of 180° in each direction. However, the direction and angle of rotation can be selected as desired and based on the particular phone handset, cable or connections, and antenna design.

In order to deploy the antenna mast 20, the user will first rotate the retracted antenna structure 12 from its stored position in groove or recess 16, illustrated in dotted outline in FIG. 1, into a deployed position as illustrated in solid lines in FIG. 1. The module may be fixed in the deployed or extended position, or may be freely rotatable to seek a vertical orientation, as described above. The mast 20 is then pulled out from the base into its fully extended position, with the engagement of pins 28, 29 in grooves 30, 31 causing the mast to rotate in an anti-clockwise direction, uncoiling cables 24, 26 as they are extended. FIG. 2 illustrates the mast in a fully extended condition. In the illustrated embodiment, the cables are secured to feed points or contacts 22 at an intermediate position along the length of mast 20. However, in alternative embodiments the cables may be secured to the mast contacts at different positions, for example adjacent the lower end of the mast.

When the mast is extended as in FIG. 2, satellite communications can be carried out with the antenna sending and receiving signals transmitted to and from the handset. When communications are completed, the user simply telescopes mast 20 back into the base 18, with the engagement of the pins in the grooves causing the mast to simultaneously rotate in a clockwise direction, coiling up the cables 24, 26 and reducing torque which could otherwise cause failure of the cables or connections at contacts 22. The antenna structure is then rotated back for storage in recess 16.

Figure 3:
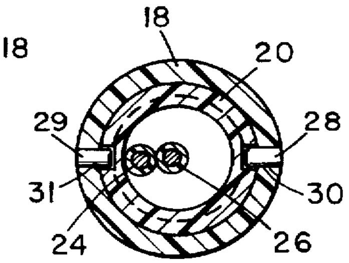
FIG. 3 is an enlarged sectional view taken along line 3—3 of FIG. 2.

The pins are preferably of round cross-section, while the grooves are of square cross-section, as best illustrated in FIG. 3. Each groove extends in a clockwise direction around the mast from the upper end of the mast towards the lower end of the mast. The use of diametrically opposed pins and grooves helps to stabilize the structure as the mast is extended and retracted. However, one pin and groove may be sufficient in some cases, and more than two pins may be used for added stability.

Figure 4:
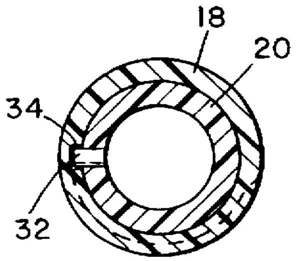
FIG. 4 is a similar sectional view showing an alternative pin and groove arrangement.

Instead of providing pins on the base 18 for engagement in grooves on the mast 20, as in FIGS. 1 and 2, one or more pins 32 may instead project outwardly from mast 20 for engagement in a corresponding helical groove 34 or grooves provided on the inner surface of tubular base 18, as illustrated in FIG. 4. As in the previous embodiment, the orientation of the helical groove 34 is such that the mast rotates in an anti-clockwise direction as it is extended, and a clockwise direction as it is retracted. This arrangement has the advantage that a suitable seal such as an O-ring can be mounted at the upper end of groove 34 to reduce the risk of dirt entering the groove.

Instead of mounting the antenna on a module 14, the antenna may be mounted to telescope directly into the telephone handset body. In this case, the lower portion or base may comprise a short, cylindrical member used only to guide and support the upper mast when extended. When lowered or stowed, the upper mast will be located in a portion of the handset, which may be walled off if necessary.

With the mast arrangement of this invention, a telescoping antenna can be provided which has a minimal length, low loss coaxial cable while maintaining high reliability. This is achieved by coiling and uncoiling the cable as the mast is retracted and extended, rather than simply axially compressing and extending the cable which could result in stretching and torsion. The structure of this invention coils up the cable as the mast is retracted in a manner that substantially reduces the risk of breakdown or failure even with a minimal length cable.

Although some preferred embodiments of the present invention have been described above by way of example only, it will be understood by those skilled in the field that modifications may be made to the disclosed embodiments without departing from the scope of the present invention, which is defined by the appended claims.

What I claim is:

1. A telescoping antenna assembly, comprising:

a tubular base for securing to a wireless telephone handset;

an extendible mast telescopically mounted on the tubular base for movement between an extended position extending out of the tubular base and a retracted position in which at least a portion of the mast is retracted within the tubular base;

the tubular base having a cylindrical inner surface and the mast having an opposing cylindrical outer surface for fitting within the tubular base in the retracted position; and one of the opposing cylindrical surfaces of the base and mast having a helical groove extending along at least part of its length, and the other cylindrical surface having at least one pin for sliding engagement in the groove, whereby the engagement of the pin in the helical groove causes the mast to rotate relative to the base in a first direction as the mast is moved from the retracted to the extended position, and in a second direction as the mast is moved from the extended to the retracted position.

2. The assembly as claimed in claim 1, wherein two diametrically opposed pins are provided on said one cylindrical surface and two diametrically spaced helical grooves are provided on said other cylindrical surface for engagement with the respective pins.

3. The assembly as claimed in claim 1, wherein the pin is provided on the inner surface of the tubular base and the helical groove is provided on the outer surface of the mast.

4. The assembly as claimed in claim 1, wherein the pin is provided on the outer surface of the mast and the helical groove is provided on the inner surface of the tubular base.

5. The assembly as claimed in claim 1, wherein the pin and groove each have a low-friction surface.

6. The assembly as claimed in claim 5, wherein the surface is of self-lubricating plastic material.

7. The assembly as claimed in claim 1, including a coiled antenna feed line having a first end secured to the inner surface of said mast and a second end extending through the tubular base for connection to send and receive circuitry in a wireless telephone handset, the helical groove being oriented such that the mast rotates to uncoil the feed line as the mast is extended and coil the feed line as the mast is retracted.

8. The assembly as claimed in claim 1, wherein the pin is a round pin and the groove is of rectangular cross-section.

9. The assembly as claimed in claim 1, wherein the pitch of the helical groove is such that the mast rotates through a predetermined angle as the mast is extended and deployed.

10. The assembly as claimed in claim 9, wherein the mast rotates through 180° between the fully retracted and the fully extended position.

11. The assembly as claimed in claim 1, wherein the orientation of the helical groove is such that the mast rotates in an anti-clockwise direction as the mast is extended and a clockwise direction as the mast is retracted into the base.

12. A portable telephone unit, comprising:

a wireless telephone handset having a microphone and a speaker;

an antenna assembly having a tubular base secured to the telephone handset and an extendible mast telescopically mounted on the tubular base for movement between an extended position extending out of the tubular base and a retracted position;

a coiled coaxial cable having a first end secured in the telephone handset and extending through the tubular base into the antenna mast, the cable having a second end secured to the antenna mast for providing an antenna feed line;

the tubular base having a cylindrical inner surface and the mast having an opposing cylindrical outer surface for fitting within the tubular base in the retracted position; and one of the opposing cylindrical surfaces of the base and mast having a helical groove extending along at least part of its length, and the other cylindrical surface having at least one pin for sliding engagement in the groove, whereby the engagement of the pin in the helical groove causes the mast to rotate relative to the base in a first direction as the mast is moved from the retracted to the extended position, and in a second direction as the mast is moved from the extended to the retracted position, whereby the coiled cable is uncoiled as the mast is extended and coiled up as the mast is retracted.

13. The unit as claimed in claim 12, including an antenna module rotatably mounted on the handset, the antenna base being secured to the antenna module, at least the majority of the extendible mast being retracted within the base in the retracted position.

* * * * *